United States Patent
Huang et al.

(10) Patent No.: US 11,291,910 B2
(45) Date of Patent: Apr. 5, 2022

(54) APPARATUSES AND METHODS FOR PROVIDING A VIRTUAL INPUT KEY

(71) Applicant: MEDIATEK INC., Hsinchu (TW)

(72) Inventors: Kuo-Hsiung Huang, Hsinchu (TW); Wen-Kai Chiu, Hsinchu (TW); Ya-Ting Tsai, Hsinchu (TW); Chia-Hsin Yang, Hsinchu (TW); Kun-Tien Kuo, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 89 days.

(21) Appl. No.: 16/791,567

(22) Filed: Feb. 14, 2020

(65) Prior Publication Data

US 2021/0252385 A1 Aug. 19, 2021

(51) Int. Cl.
*A63F 13/218* (2014.01)
*A63F 13/92* (2014.01)
*G06F 3/16* (2006.01)
*G06F 3/0487* (2013.01)
*A63F 13/215* (2014.01)

(52) U.S. Cl.
CPC .......... *A63F 13/218* (2014.09); *A63F 13/215* (2014.09); *A63F 13/92* (2014.09); *G06F 3/0487* (2013.01); *G06F 3/167* (2013.01); *A63F 2300/204* (2013.01)

(58) Field of Classification Search
None
See application file for complete search history.

(56) References Cited

U.S. PATENT DOCUMENTS

| 7,511,711 | B2 | 3/2009 | Ing et al. | |
|---|---|---|---|---|
| 9,058,071 | B2 | 6/2015 | Esteve | |
| 2010/0194692 | A1* | 8/2010 | Orr | G06F 3/0416 345/173 |
| 2013/0342485 | A1* | 12/2013 | Kim | G06F 3/041 345/173 |
| 2014/0320447 | A1* | 10/2014 | Kung | G06F 3/0445 345/174 |
| 2014/0354567 | A1* | 12/2014 | Park | G06F 1/1684 345/173 |

FOREIGN PATENT DOCUMENTS

| CN | 1669048 A | 9/2005 |
|---|---|---|
| CN | 110363120 A | 10/2019 |
| TW | 201131443 A | 9/2011 |
| TW | 201205391 A | 2/2012 |
| WO | 2006/108443 A1 | 10/2006 |

OTHER PUBLICATIONS

Chinese language office action dated Jul. 21, 2021, issued in application No. TW 109140059.

* cited by examiner

*Primary Examiner* — Ronald Laneau
(74) *Attorney, Agent, or Firm* — McClure, Qualey & Rodack, LLP

(57) ABSTRACT

A mobile electronic apparatus including an audio receiver and a controller is provided. The audio receiver receives a reference signal via a first hole and a second hole on a housing of the mobile electronic apparatus. The controller detects a touch event on the second hole according to the received reference signal.

12 Claims, 7 Drawing Sheets

APPARATUSES AND METHODS FOR PROVIDING A VIRTUAL INPUT KEY

BACKGROUND OF THE APPLICATION

Field of the Application

The application generally relates to Man-Machine Interface (MMI) technology, and more particularly, to apparatuses and methods for providing a virtual input key.

Description of the Related Art

To an increasing extent, touch screens are being used as an alternative way to interact with mobile electronic apparatuses, such as smartphones, media player devices, portable gaming consoles, etc. In most practices, a touch screen includes a display screen integrated with or placed underneath a touch panel, and it is usually disposed on the main plane of a mobile electronic apparatus to provide a Graphical User Interface (GUI) for a user to interact with by using, for example, a pointer, a stylus, a finger, etc.

For a mobile gaming application (APP) executed on a smartphone, the GUI provided on the touch screen is generally the only media to receive gaming control inputs from the user. As the complexity of mobile gaming APPs grows, various types of inputs are required from the user to control the actions of the game character. FIG. 1 is a schematic diagram illustrating the GUI of a First-Person Shooting (FPS) game. As shown in FIG. 1, there are several action buttons, including "moving", "aiming", "firing", "jumping", and "reloading", etc., on the bottom left and right corners of the GUI, and the user generally uses his/her two thumbs to press the action buttons to control the actions of the game character. However, in times when complicated actions of the game character are desired, the user may find it hard to press multiple action buttons at the same time with only two thumbs.

A common solution to this problem is to provide hardware add-ons, such as a game grip, a joystick, and physical buttons, for allowing more fingers to press the action buttons. FIG. 2 is a schematic diagram illustrating a mobile gamepad set. However, the user needs to carry the mobile gamepad set in case he/she may want to play the mobile game at some time, which is inconvenient to the user. Moreover, the user needs to install the mobile gamepad set before playing a mobile game, but the installation of the mobile gamepad set is time-consuming.

Therefore, it is desirable to have an add-on-free MMI for assisting users with more flexible interactions with the mobile gaming APPs.

BRIEF SUMMARY OF THE APPLICATION

The present application proposes an add-on-free MMI that provides a virtual input key for assisting users with more flexible interactions with the mobile gaming APPs. Specifically, an extra hole is provided on the housing of a mobile electronic apparatus as the virtual input key. The extra hole may allow an audio receiver (e.g., a microphone) within the mobile electronic apparatus to receive a reference signal output by an audio output device (e.g., a speaker). Based on the reference signal received via the extra hole, a touch event occurring on the extra hole may be detected.

In one aspect of the application, a mobile electronic apparatus comprising an audio receiver and a controller is provided. The audio receiver is configured to receive a reference signal via a first hole and a second hole on a housing of the mobile electronic apparatus. The controller is configured to detect a touch event on the second hole according to the received reference signal.

In another aspect of the application, a method for providing a virtual input key, executed by a mobile electronic apparatus comprising an audio receiver, is provided. The method comprises the steps of: configuring the audio receiver to receive a reference signal via a first hole and a second hole on a housing of the mobile electronic apparatus; and detecting a touch event on the second hole according to the received reference signal.

Other aspects and features of the present application will become apparent to those with ordinarily skill in the art upon review of the following descriptions of specific embodiments of the mobile electronic apparatuses and the methods for providing a virtual input key.

BRIEF DESCRIPTION OF DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. The terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 3:
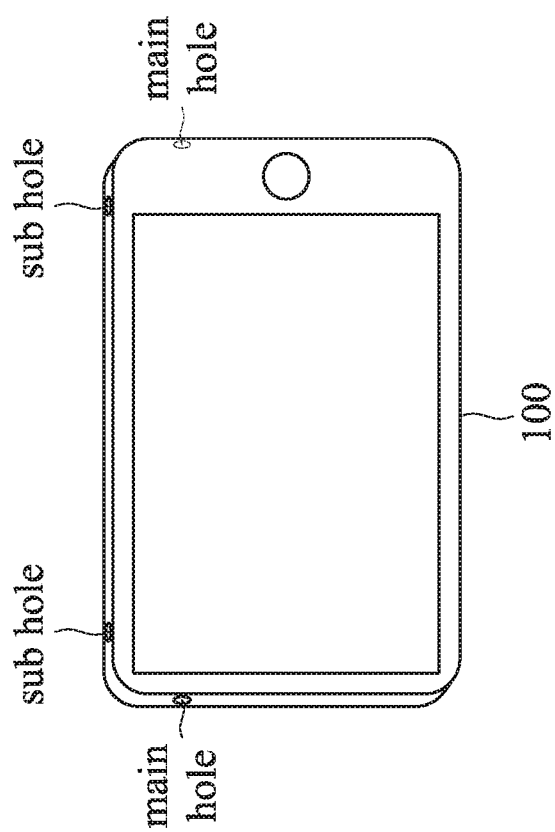
FIG. 3 shows the front view of a mobile electronic apparatus according to an embodiment of the application.

FIG. 3 shows the front view of a mobile electronic apparatus according to an embodiment of the application.

The mobile electronic apparatus 100 may be a smartphone, a tablet computer, a media player device, or a portable gaming console, etc.

As shown in FIG. 3, the mobile electronic apparatus 100 is placed in the landscape orientation, and a main hole and a sub hole are provided on each of the upper left corner and the upper right corner of the mobile electronic apparatus 100. Specifically, the main holes and the sub holes are openings on the housing of the mobile electronic apparatus 100.

Although not shown, the mobile electronic apparatus 100 may include two separate audio receivers disposed near the upper left corner and the upper right corner. The main hole and the sub hole on the upper left corner may be configured to allow audio signals to pass through to the audio receiver disposed near the upper left corner within the mobile electronic apparatus 100. Likewise, the main hole and the sub hole on the upper right corner may be configured to allow audio signals to pass through to the audio receiver disposed near the upper right corner within the mobile electronic apparatus 100.

Based on the audio signals received by each audio receiver, the touch events on each sub hole may be detected. Therefore, each sub hole may be used as a virtual input key. For example, the sub hole on the upper left corner may be used as a virtual input key L1 for receiving an extra input from a left finger (e.g., the left index finger), and the sub hole on the upper right corner may be used as a virtual input key R1 for receiving an extra input from a right finger (e.g., the right index finger).

Figure 1:
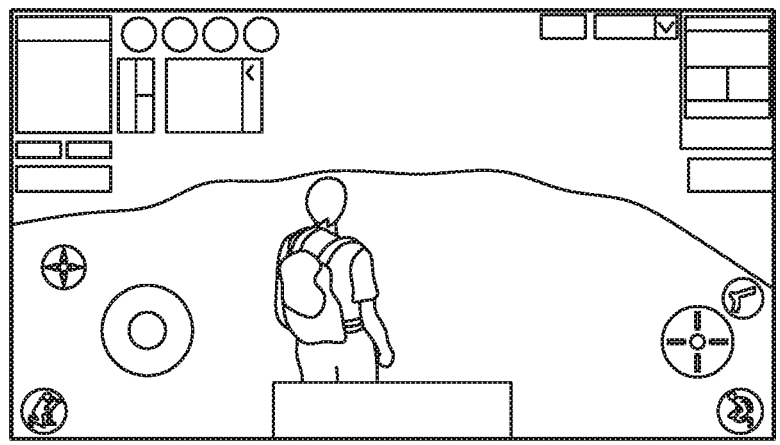
FIG. 1 is a schematic diagram illustrating the GUI of a First-Person Shooting (FPS) game.
Figure 2:
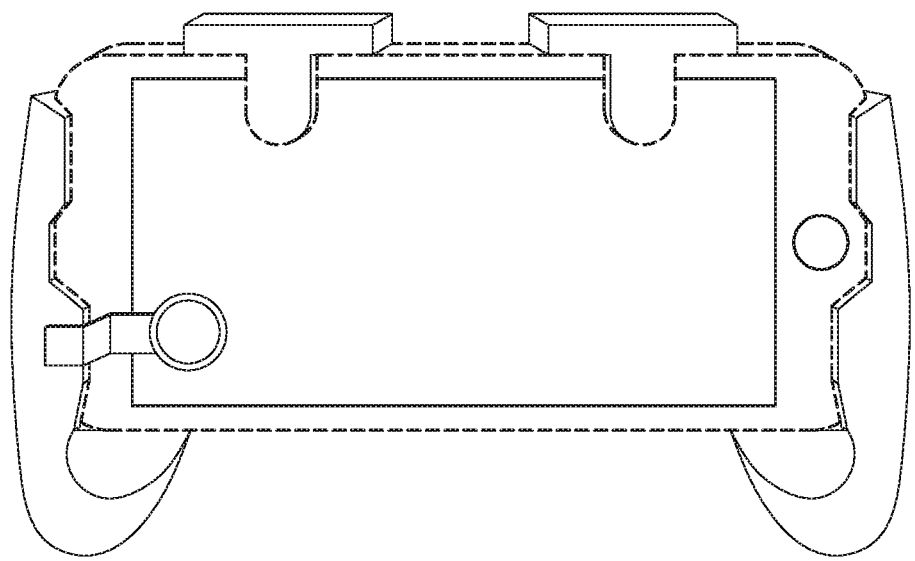
FIG. 2 is a schematic diagram illustrating a mobile gamepad set.
Figure 4:
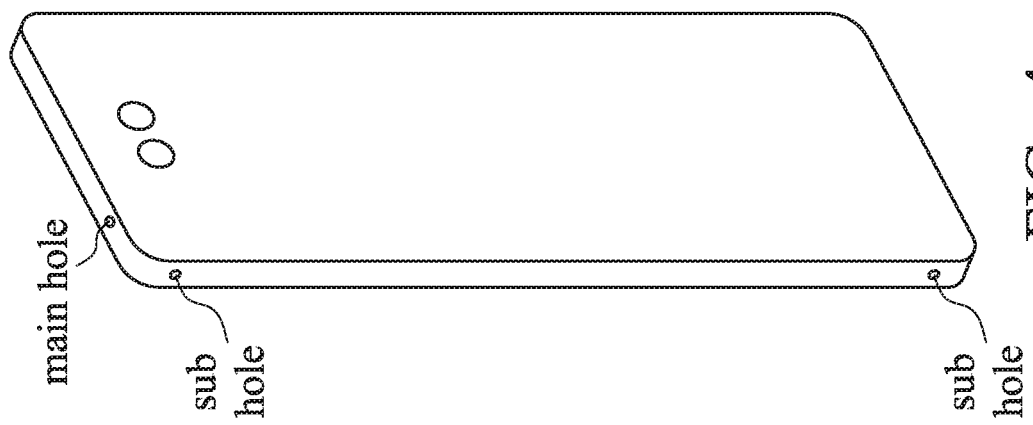
FIG. 4 shows a perspective view of the mobile electronic apparatus 100 according to an embodiment of the application.

FIG. 4 shows a perspective view of the mobile electronic apparatus 100 according to an embodiment of the application.

As shown in FIG. 4, the mobile electronic apparatus 100 is placed in the portrait orientation, and the back plane and the side plane of the mobile electronic apparatus 100 are displayed.

More specifically, two sub holes are provided on the side plane of the mobile electronic apparatus 100, wherein one sub hole is provided near the top of the side plane of the mobile electronic apparatus 100, and the other sub hole is provided near the bottom of the side plane of the mobile electronic apparatus 100.

Figure 5:
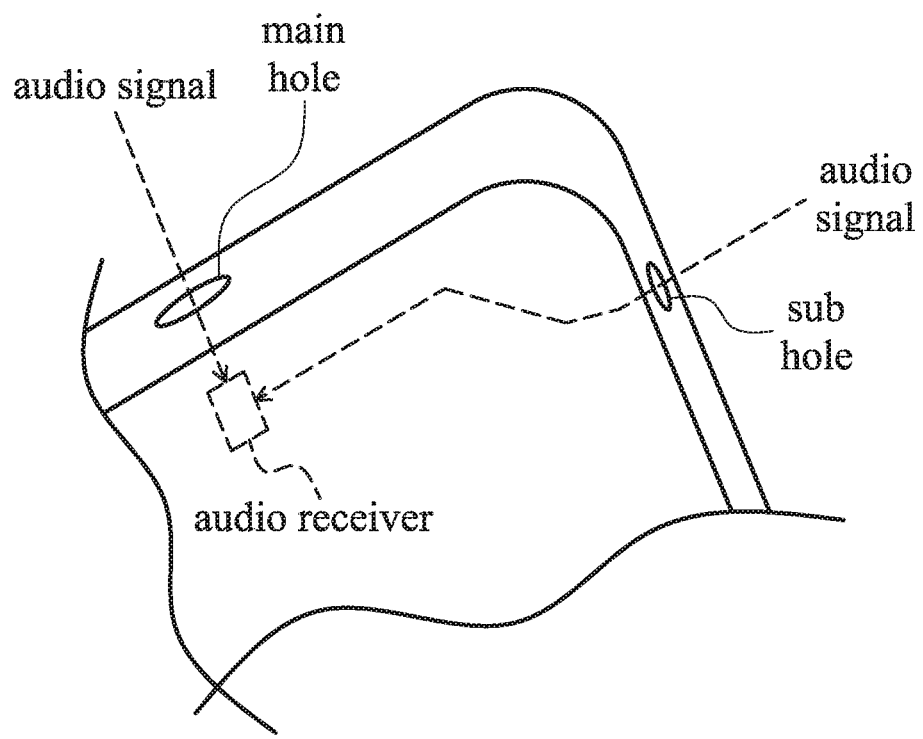
FIG. 5 shows the details around an audio receiver of the mobile electronic apparatus 100 according to an embodiment of the application.

FIG. 5 shows the details around an audio receiver of the mobile electronic apparatus 100 according to an embodiment of the application.

As shown in FIG. 5, a main hole and a sub hole are provided on a corner of the mobile electronic apparatus 100 to allow the audio signal to pass through the housing of the mobile electronic apparatus 100 to the audio receiver within the mobile electronic apparatus 100.

To further clarify, the audio signal entering the main holes may be provided with a flat amplitude response at all frequencies, while the audio signal entering the sub holes may be boosted at higher frequencies (i.e., frequencies higher than a predetermined threshold).

Specifically, the sub holes allow all frequencies of the audio signal to pass through the sub holes, but the higher frequencies of the audio signal are boosted during the propagation from the sub holes to the audio receiver.

In one embodiment, an acoustic tube may be coupled between the audio receiver and the sub hole at a corner of the mobile electronic apparatus 100, and the acoustic tube may be configured to boost the higher frequencies of the audio signal entering the sub hole (e.g., for identifying a long-press event and/or a tap event on the sub hole) and to introduce the boosted audio signal to the audio receiver.

Similarly, an acoustic tube may be coupled between the audio receiver and the main hole at a corner of the mobile electronic apparatus 100, but the acoustic tube may be configured to pass all frequencies of the audio signal with a flat amplitude response and to introduce the audio signal to the audio receiver.

In another embodiment, the acoustic tube coupled between the audio receiver and the sub hole at a corner of the mobile electronic apparatus 100 may be configured to pass all frequencies of the audio signal with a flat amplitude response (e.g., for identifying a tap event on the sub hole) and to introduce the audio signal to the audio receiver.

Figure 6:
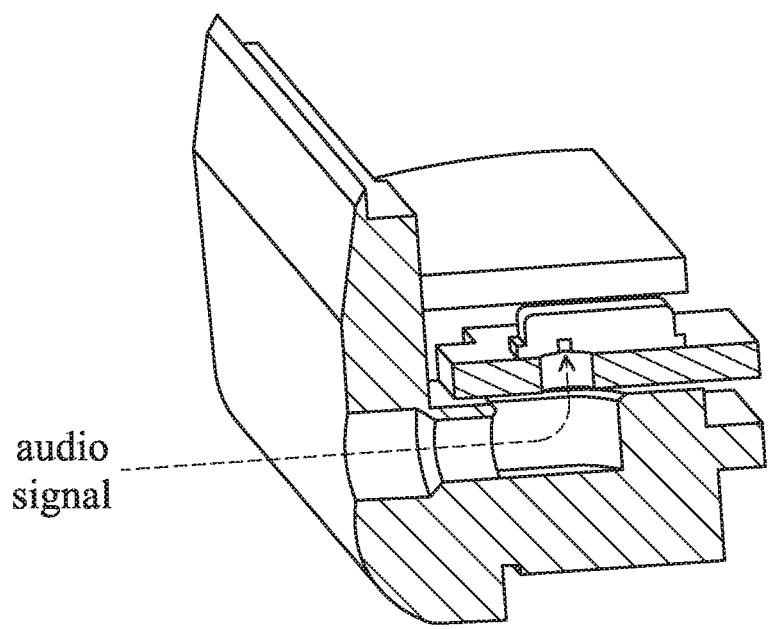
FIG. 6 shows a section view of an acoustic tube according to an embodiment of the application.

FIG. 6 shows a section view of an acoustic tube according to an embodiment of the application.

As shown in FIG. 6, the acoustic tube may be comprised of various parts and the assembly of the parts forms a conduit connecting one sub hole to one audio receiver. In particular, the parts may be made with different materials, such as rubber, and Printed Circuit Board (PCB), etc., and due to different materials and structures used for the parts, the audio signals passing through the acoustic tube may be altered with the higher frequencies being boosted or may be unchanged at all frequencies.

Figure 7A:
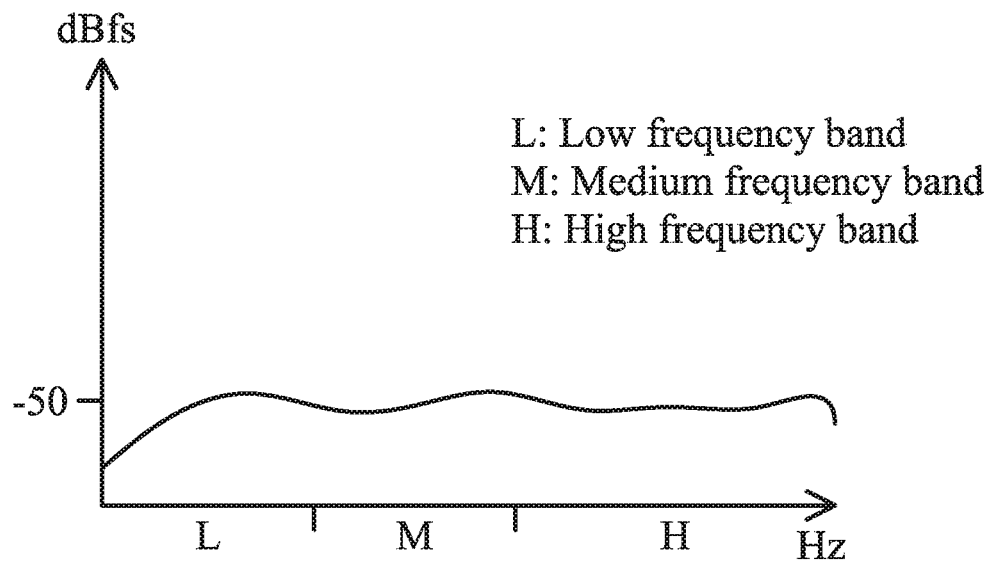
FIGS. 7A and 7B shows an audio signal before and after being altered according to an embodiment of the application.
Figure 7B:
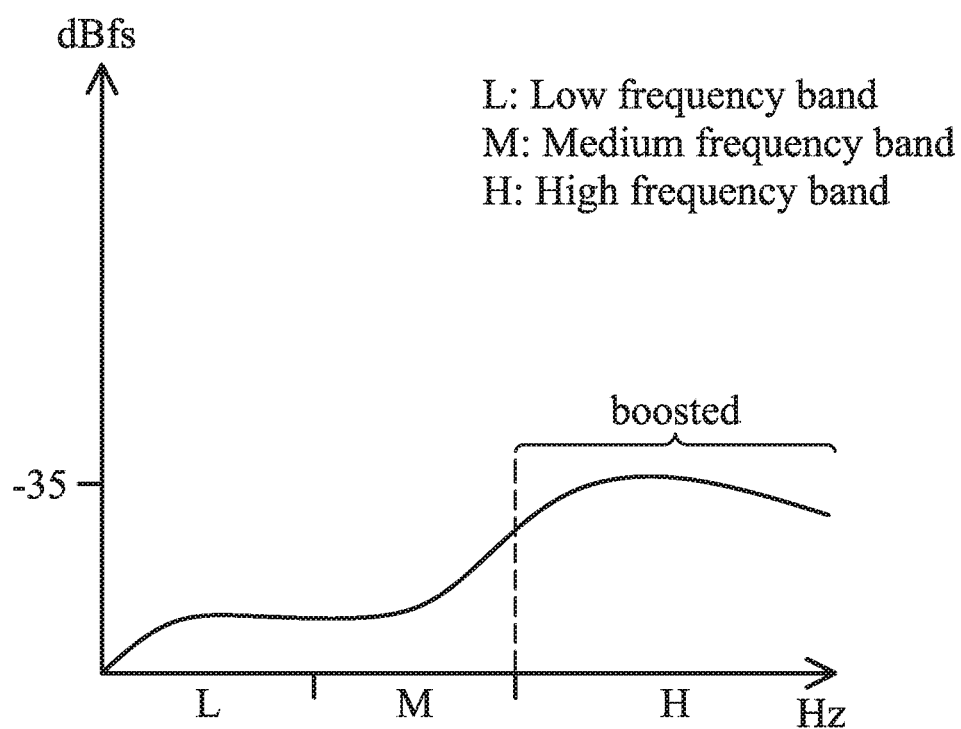

FIGS. 7A and 7B shows an audio signal before and after being altered according to an embodiment of the application.

As shown in FIG. 7A, an audio signal entering the sub hole may be represented as a winding curve with the vertical axis indicating the amplitude and the horizontal axis indicating the frequencies.

As shown in FIG. 7B, the audio signal received by the audio receiver may be represented as a different curve with the higher frequencies being boosted during the propagation from the sub hole to the audio receiver.

Figure 8:
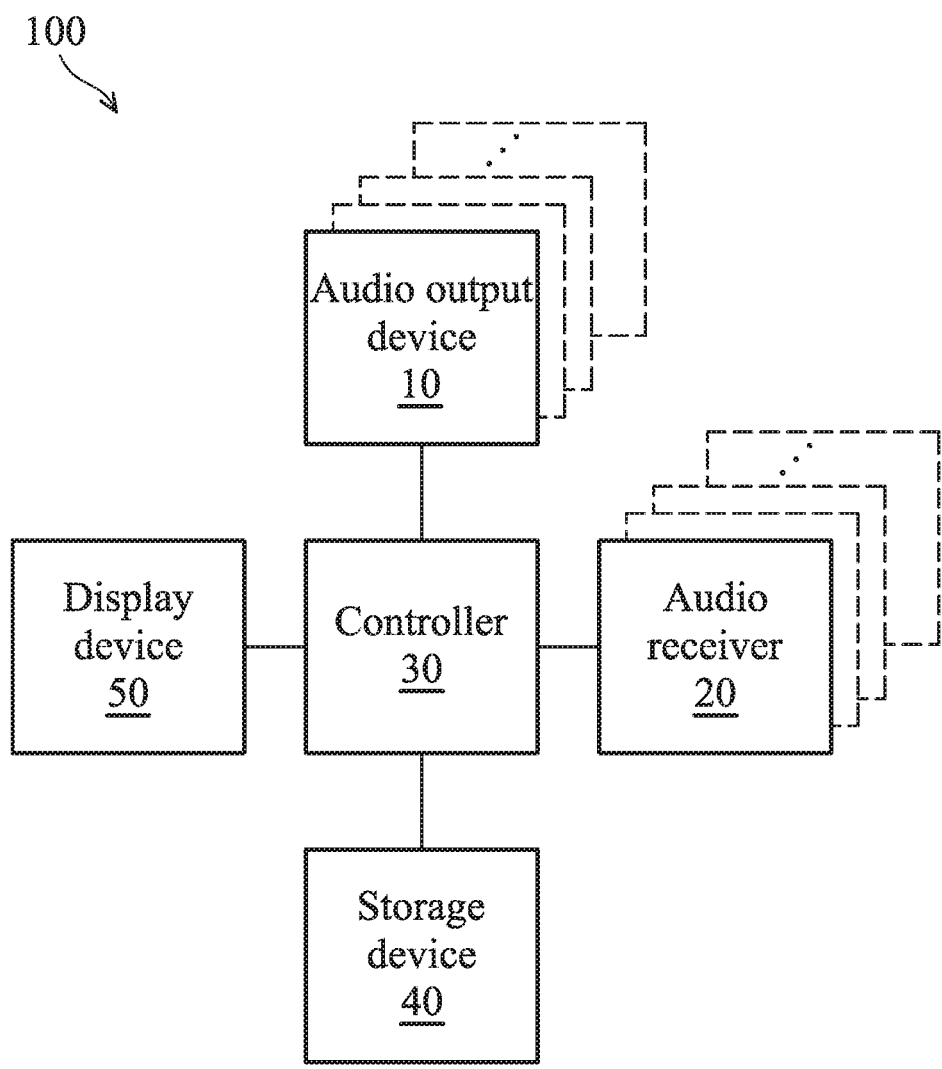
FIG. 8 is a block diagram illustrating the mobile electronic apparatus 100 according to an embodiment of the application.

FIG. 8 is a block diagram illustrating the mobile electronic apparatus 100 according to an embodiment of the application.

As shown in FIG. 8, the mobile electronic apparatus 100 may include one or more audio output device(s) 10, one or more audio receiver(s) 20, a controller 30, a storage device 40, and a display device 50.

Each audio output device 10 may be a speaker which is configured to output a reference signal when the mobile electronic apparatus 100 enters the game mode (i.e., when a mobile gaming APP is launched).

Specifically, the reference signal is at frequencies outside of the human auditory range. For example, the human ear may perceive frequencies between 20 Hz (lowest pitch) to 20 KHz (highest pitch). Therefore, any sound below 20 Hz or above 20 KHz may be imperceptible to the human ear, and may be used as a reference signal.

In another embodiment, the audio output device(s) 10 may be external to the mobile electronic apparatus 100, and may be wirelessly connected to the mobile electronic apparatus 100 to receive a command indicating the audio output device(s) 10 to output the reference signal.

Each audio receiver 20 may be a microphone which is configured to receive the reference signal via the main hole and sub hole which are indirectly connected to the audio receiver 20.

The controller 30 may be a general-purpose processor, a Micro Control Unit (MCU), an application processor, a baseband processor, a Digital Signal Processor (DSP), a Graphics Processing Unit (GPU), a Holographic Processing Unit (HPU), a Neural Processing Unit (NPU), or the like, which includes various circuits for providing the functions of data processing and computing, controlling the audio output device(s) 10 to output the reference signal, controlling the audio receiver(s) 20 to receive the reference signal, storing and retrieving data (e.g., program code) to and from the storage device 40, and sending a series of frame data (e.g. representing text messages, graphics, images, etc.) associated with the GUI of a mobile gaming APP to the display device 50.

In particular, the controller 30 coordinates the aforementioned operations of the audio output device(s) 10, the audio receiver(s) 20, the storage device 40, and the display device 50 for performing the method for providing a virtual input key.

As will be appreciated by persons skilled in the art, the circuits of the controller 30 will typically include transistors that are configured in such a way as to control the operation of the circuits in accordance with the functions and operations described herein. As will be further appreciated, the specific structure or interconnections of the transistors will typically be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 40 may be a non-transitory machine-readable storage medium, including a memory, such as a FLASH memory or a Non-Volatile Random Access Memory (NVRAM), or a magnetic storage device, such as a hard disk or a magnetic tape, or an optical disc, or any combination thereof for storing data, instructions, and/or program code of mobile gaming APPs, communication protocols, and/or the method for providing a virtual input key.

The display device 50 may be a Liquid-Crystal Display (LCD), a Light-Emitting Diode (LED) display, an Organic LED (OLED) display, or an Electronic Paper Display (EPD), etc., for displaying the GUIs of mobile gaming APPs. Alternatively, the display device 50 may further include one or more touch sensors disposed thereon or thereunder for sensing touches, contacts, or approximations of objects, such as fingers or styluses.

It should be understood that the components described in the embodiment of FIG. 8 are for illustrative purposes only and are not intended to limit the scope of the application.

For example, the mobile electronic apparatus 100 may include more components, such as a power supply, a wireless transceiver, and/or an Input/Output (I/O) device. The power supply may be a mobile/replaceable battery providing power to all the other components of the mobile electronic apparatus 100. The wireless transceiver may provide the function of wireless communications for use by the mobile gaming APPs that require internet connections. The I/O device may include one or more buttons, and/or a video camera, etc.

Figure 9:
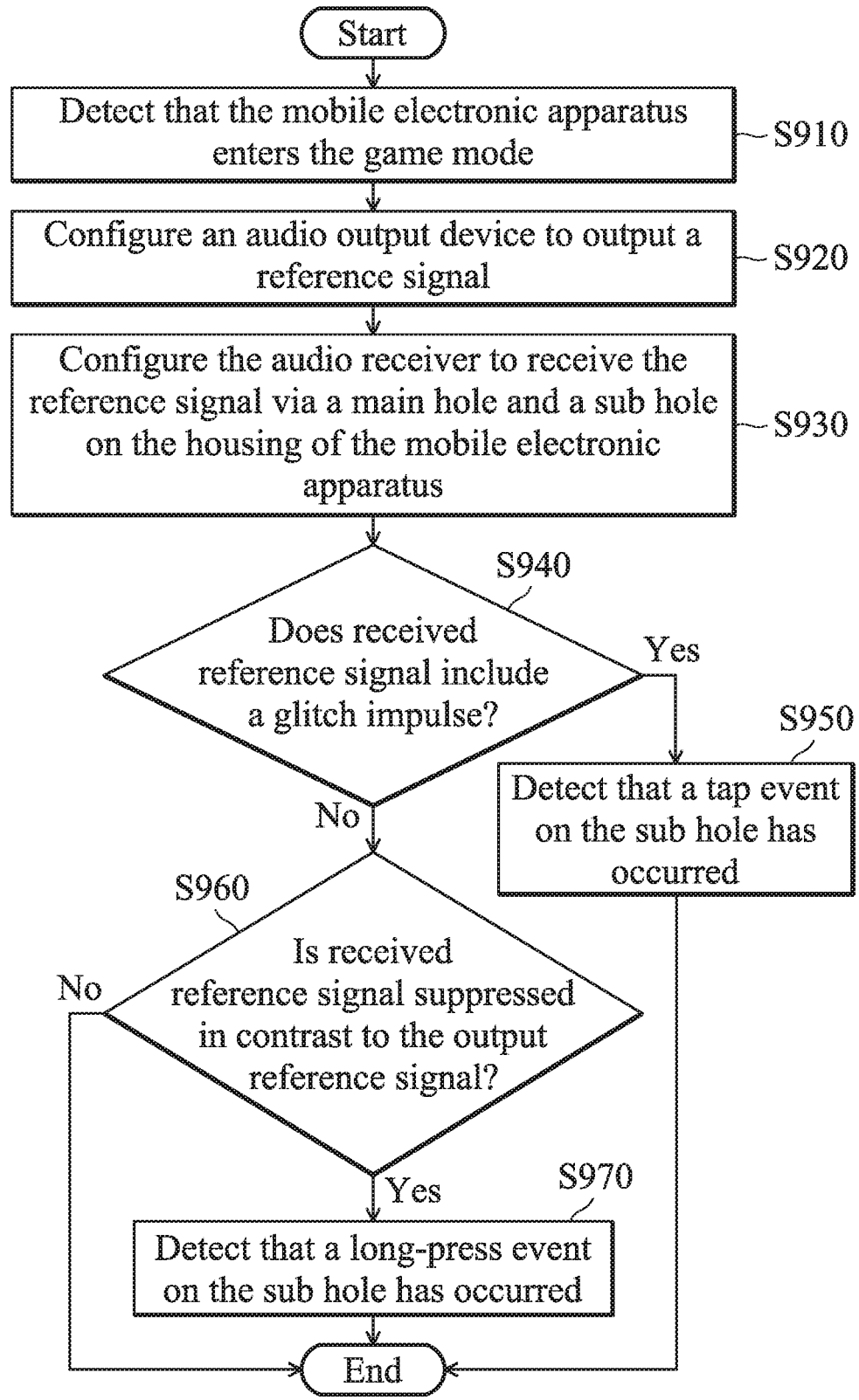
FIG. 9 is a flow chart illustrating the method for providing a virtual input key according to an embodiment of the application.

FIG. 9 is a flow chart illustrating the method for providing a virtual input key according to an embodiment of the application.

In this embodiment, the method for providing a virtual input key is applied to and executed by a mobile electronic apparatus (e.g., the mobile electronic apparatus 100) which has at least two holes on the housing of the mobile electronic apparatus to allow the reference signal to pass through to the audio receiver within the mobile electronic apparatus.

To begin with, the mobile electronic apparatus detects that it is configured to enter the game mode (i.e., a mobile gaming APP is launched) (step S910).

In response to entering the game mode, the mobile electronic apparatus configures an audio output device to output a reference signal (step S920).

In one embodiment, the audio output device may be a component (e.g., the audio output device 10) within the mobile electronic apparatus.

In another embodiment, the audio output device may be a component external to the mobile electronic apparatus, which may be wirelessly connected to the mobile electronic apparatus to receive configuration command from the mobile electronic apparatus.

Next, the mobile electronic apparatus configures the audio receiver to receive the reference signal via a main hole and a sub hole on the housing of the mobile electronic apparatus (step S930).

After that, the mobile electronic apparatus determines whether the received reference signal includes a glitch impulse (step S940).

Subsequent to step S940, if the received reference signal includes a glitch impulse, the mobile electronic apparatus detects that a tap event on the sub hole has occurred (step S950), and the method ends.

Figure 10:
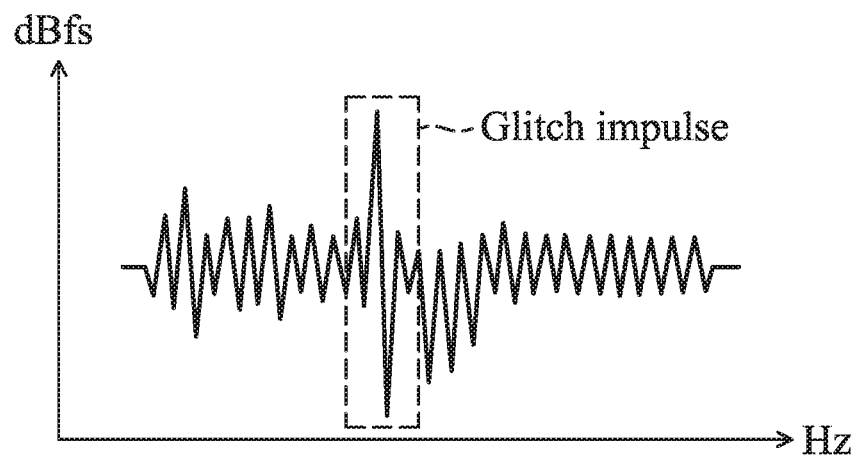
FIG. 10 is an exemplary diagram illustrating au audio signal including a glitch impulse according to an embodiment of the application.

Specifically, a tap event refers to a type of touch event that involves an object (e.g., a finger) swiftly touching the sub hole for once, and the tap event may cause a glitch impulse to appear in the received reference signal, as exemplified in FIG. 10.

Subsequent to step S940, if the received reference signal does not include a glitch impulse, the mobile electronic apparatus determines whether the received reference signal is suppressed in contrast to the output reference signal (step S960).

Subsequent to step S960, if the received reference signal is suppressed in contrast to the output reference signal, the mobile electronic apparatus detects that a long-press event on the sub hole has occurred (step S970), and the method ends.

Figure 11:
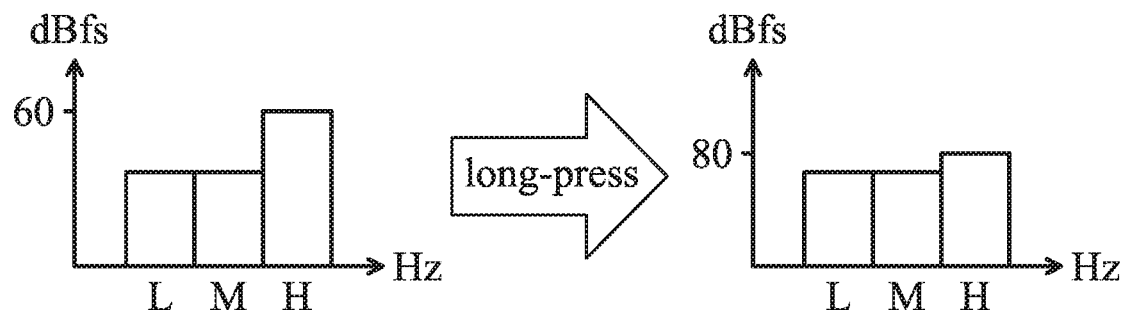
FIG. 11 is an exemplary diagram illustrating au audio signal before and after long pressing the sub hole according to an embodiment of the application.

Specifically, a long-press event refers to a type of touch event that involves an object (e.g., a finger) touching the sub hole for a period of time longer than a predetermined threshold, and the long-press event may cause the reference signal received via the sub hole to be suppressed, while the reference signal received via the main hole is not suppressed (assuming nothing is blocking the main hole). As a result, the reference signal received by the audio receiver may appear to be suppressed at higher frequencies, as exemplified in FIG. 11.

In view of the forgoing embodiments, it should be appreciated that the present application realizes a flexible MMI with at least one virtual input key to assist users with more flexible interactions with the mobile gaming APPs executed on a mobile electronic apparatus, by providing an extra hole on the housing of the mobile electronic apparatus and using the reference signal received via the extra hole as the basis to detect touch events, such as a tap event, and/or a long-press event. Advantageously, user experience of playing mobile games on a mobile electronic apparatus may be significantly improved.

While the application has been described by way of example and in terms of preferred embodiment, it should be understood that the application is not limited thereto. Those who are skilled in this technology can still make various alterations and modifications without departing from the scope and spirit of this application. Therefore, the scope of the present application shall be defined and protected by the following claims and their equivalents.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

What is claimed is:

1. A mobile electronic apparatus, comprising:
   a first hole and a second hole, each of which is a respective opening on a housing of the mobile electronic apparatus;
   an audio receiver, configured to receive a reference signal via the first hole and the second hole; and
   a controller, configured to detect a touch event occurring on the second hole according to the reference signal received via the first hole and the second hole;
   wherein the reference signal entering the first hole is provided with a flat amplitude response at all frequencies, while the reference signal entering the second hole is boosted at frequencies higher than a predetermined threshold.

2. The mobile electronic apparatus of claim 1, wherein the detecting of the touch event comprises determining whether the received reference signal comprises a glitch impulse, and detecting a tap event occurring on the second hole when the received reference signal comprises a glitch impulse.

3. The mobile electronic apparatus of claim 1, further comprising:
   au audio output device, configured to output the reference signal prior to the reference signal being received by the audio receiver, when the mobile electronic apparatus enters a game mode.

4. The mobile electronic apparatus of claim 3, wherein the detecting of the touch event comprises determining whether the received reference signal is suppressed in contrast to the output reference signal, and detecting a long-press event occurring on the second hole when the received reference signal is suppressed in contrast to the output reference signal.

5. The mobile electronic apparatus of claim 1, further comprising an acoustic tube which is coupled between the audio receiver and the second hole, and is configured to boost the higher frequencies of the reference signal entering the second hole and to introduce the boosted reference signal to the audio receiver.

6. The mobile electronic apparatus of claim 1, wherein the second hole is disposed on a side surface of the housing of the mobile electronic apparatus.

7. A method, executed by a mobile electronic apparatus comprising a first hole and a second hole, each of which is a respective opening on a housing of the mobile electronic apparatus, and an audio receiver, the method comprising:
   receiving, by the audio receiver, a reference signal via the first hole and the second hole; and
   detecting a touch event occurring on the second hole according to the reference signal received via the first hole and the second hole;
   wherein the reference signal entering the first hole is provided with a flat amplitude response at all frequencies, while the reference signal entering the second hole is boosted at frequencies higher than a predetermined threshold.

8. The method of claim 7, wherein the detecting of the touch event comprises:
   determining whether the received reference signal comprises a glitch impulse; and
   detecting a tap event occurring on the second hole when the received reference signal comprises a glitch impulse.

9. The method of claim 7, further comprising:
   configuring an audio output device to output the reference signal prior to the reference signal being received by the audio receiver, when the mobile electronic apparatus enters a game mode.

10. The method of claim 9, wherein the detecting of the touch event comprises:
    determining whether the received reference signal is suppressed in contrast to the output reference signal; and
    detecting a long-press event occurring on the second hole when the received reference signal is suppressed in contrast to the output reference signal.

11. The method of claim 7, further comprising:
    providing an acoustic tube which is coupled between the audio receiver and the second hole, and is configured to boost the higher frequencies of the reference signal entering the second hole and to introduce the boosted reference signal to the audio receiver.

12. The method of claim 7, wherein the second hole is disposed on a side surface of the housing of the mobile electronic apparatus.

* * * * *